Patented Oct. 31, 1950

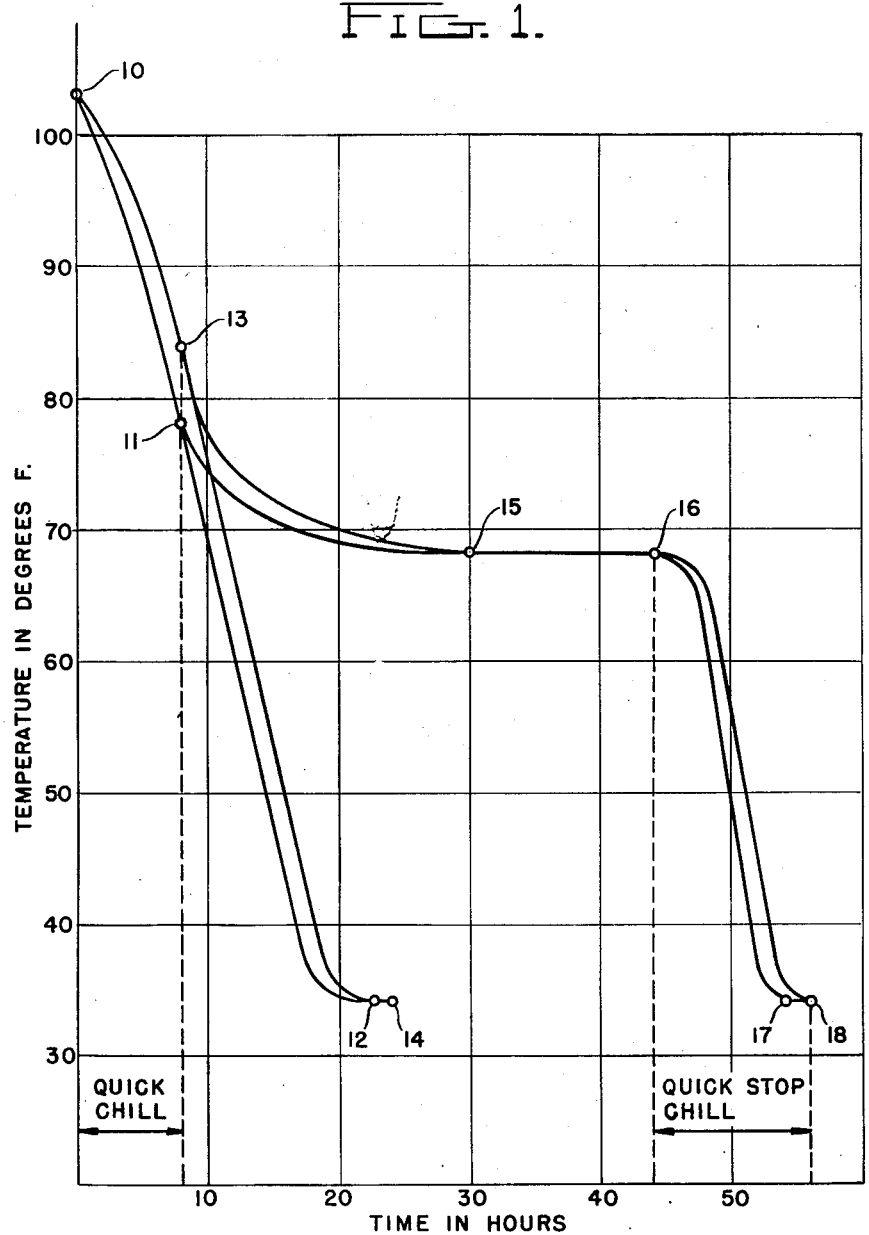

2,528,079

UNITED STATES PATENT OFFICE 2,528,079

TENDERIZATION OF MEAT

Walter Reiman and Charles L. Arnold, Cincinnati, Ohio, and Walter A. Tschirgi, White Sulphur Springs, Mont., assignors to The Kroger Company, Cincinnati, Ohio, a corporation of Ohio Application September 13, 1946, Serial No. 696,704

6 Claims. (Cl. 99—194)

It is known that meat, such as beef, may be rendered more tender by permitting the natural enzymes of the meat to act at temperatures which promote the enzymatic activity. It has been the practice to give a quick chill to the meat immediately after slaughtering, to render the flesh more firm and capable of dressing out. Usually the meat is thus reduced to a temperature of, say, 34 degrees F. and held at this temperature until it is introduced to the tenderizing procedure, for the reason that the bacterial processes are essentially inhibited or greatly delayed at such low temperature.

In tenderizing under such prior practices, the meat was raised from this holding temperature of about 34 degrees F. to a temperature of 55 to 70 degrees F. and then held at this temperature over the time required for tenderizing. When the desired condition of tenderness was attained, the meat was then given a further cooling and returned to the temperature of 34 degrees F. This procedure is expensive in that the costs for the preliminary chilling to 34 degrees F. and the costs of thereafter reheating the meat to the tenderizing range, are considerable; and it is necessary to carefully supervise and control the operation.

For example, these temperature changes are most easily produced by varying the temperature of the atmosphere surrounding the meat. During the chilling cycle this atmosphere must therefore be colder than the meat itself and this differential in temperature determines the cooling effect upon the meat per volume of air. When it is sought to produce a quick chilling by increasing the temperature difference or volume of air, the velocity of the air movement over the surface of the meat and the heating of the air in contact with the meat give rise to conditions at which moisture rapidly passes from the meat to the air, with the result of "wind-burning" and dehydration. On the other hand, when it is sought to raise the meat from the holding temperature of about 34 degrees F. to the tenderizing temperature of 55 to 70 degrees F. the air must be warmer than the meat, and likewise must circulate in order that the necessary quantity of heat can be introduced at the surface of the meat and thence penetrate inwardly to bring the entire mass of meat to the tenderizing range. Here, likewise, the differential of temperature between the atmospheric air and the meat, and the rate of movement of the air, determine the rate of heating of the meat. When this differential is large, however, the cold meat chills the air to its prevailing dew point so that the moisture is condensed upon the surface of the meat and "drip" is occasioned. Obviously, the rate of air movement is not continuously uniform throughout the chamber and at all surfaces of the meat therein; so that air properly humidified for one surface and the rate of movement thereover will be too dry and cause "wind-burning" at a second surface, and will deposit condensate at a third surface.

Controls have been established to restrict these deleterious conditions by careful inter-related proportioning of the temperature differential at the prevailing temperature of the meat, of the humidity of the air as it enters the chamber, of the rate of movement of this air and the quantity and positioning of meat in the chamber. These controls, however, also demand inherent plant and operational conditions.

It has now been found possible to effect tenderization of meat, particularly from lighter weight cattle, without preliminarily reducing it to a temperature of tenderization. For example, the freshly slaughtered meat at body temperature is subjected to a chilling down to a temperature of about 80 degrees; then is held in a treating chamber for a proper period of time while the meat is permitted slowly to decrease in temperature to a final temperature of about 68 degrees at the end of 44 hours, for example; and then the meat is given a quick chilling for stopping further tenderization effects, and therewith brought to a holding temperature of about 34 degrees F., at which it is shipped.

It has been found that when such procedure is employed, it is feasible to employ far greater air velocities through the treating chamber, and hence the actual temperature differential between the meat and the atmosphere is less and therewith more stable controlling effects can be exercised upon the relative humidity of the air, and the defects of dehydration and of condensation are both avoided. Also with this procedure the meat is held at a temperature effective for tenderization for 100 percent of the time in the process room. In addition it has been found that this permits a better control upon the moisture content of the meat; and a great saving in costs of successive chilling and heating and of supervision.

An illustrative form of practicing the invention is shown in the accompanying drawing, which illustratively portrays the temperature-time factors in the treatment of beef.

At the time of slaughter, the entire mass of meat has a body temperature as indicated by point 10 on the graph. It is then subjected to a quick chilling by placing it in the chamber having a temperature of, say, 34 degrees F. Therewith, the surface of the meat becomes quickly chilled at a rate indicated by the conventionally drawn curve 10, 11, 12 which indicates this cooling is very rapid at first but decreases in rate as the temperature of the meat approaches the temperature of the cooling air.

Due to the low conductivity of the mass of meat, its center does not cool as fast as the surface, but pursues a curve 10, 13, 14. It has been found that the maximum temperature differential between the surface and center of the meat, for sides of quarters of beef, is approximately 6 degrees F. and that this differential essentially disappears when the meat is held at a fixed temperature for two to four hours.

In accordance with the present procedure, the meat is not caused to drop to the temperature of the air indicated by the point 12, 14; but, instead, the quick chilling is interrupted when the average temperature has been brought down to around 80 degrees F., this average temperature being that taken at a point about midway between the surface and the center. At this time, either by control of the air circulating in the single treating chamber or by advancing the meat into a separate tenderizing chamber, the surrounding atmosphere is maintained at a temperature of about 68 degrees for the entering air. A further slow cooling then occurs by which the temperature of both the surface and the center of the meat become essentially equalized, for example, at point 15, this temperature being essentially the temperature of the entering air, or 68 degrees. The meat is then maintained at this tenderizing temperature of substantially 68 degrees until the desired condition of tenderness has been attained, for example, in about 44 hours after the meat has been withdrawn from the quick chilling operation exemplified by the points 11, 13. Thus, at the time-temperature point 16, the meat has attained the desired tenderness, and is then given a further quick chilling from tenderizing temperature down to the holding temperature of around 34 degrees F. The surface of the meat therewith cools essentially along the curve 16—17, while the center of the meat is cooled along the curve 16—18.

It will be noted that the entering air is at all times essentially at or below the temperature of the meat and hence no condensation is produced upon this meat regardless of the humidity of the entering air. Further, it will be noted that the actual temperature differences between the air and the meat, along the curves 10—13—15—16 and 10—11—15—16, are small and that when the meat is warmer than this air its surface does not tend to give off a large proportion of water into the air. Hence, by maintaining the humidity of the incoming air between 80 and 90 percent, the effect upon the meat is neither that of condensation nor of dehydration; and it is feasible to employ very high air velocities at points of contact of the air with the meat.

In one actual practice of the invention, this drift downwardly from 80 degrees F. to 68 degrees F. was accomplished in 44 hours as indicated by arrival of the meat at the temperature point 16 on the graph. The meat was then given a quick chilling to the temperature point 18, illustratively 34 degrees F., for stopping further tenderization effects.

In the illustrative practice, the relative humidity of the air entering the tenderizing chamber was maintained at between 80 and 90 percent, and the air flow at about 50 feet per minute along the length of this chamber. This air was subjected to sterilization by employment of ultraviolet light, thereby to eliminate infection through bacteria carried by fresh incoming air, and for the purpose of killing or retarding the action of the bacteria already present on the surface of the meat. The circulating air, as withdrawn from the chamber, was passed through a temperature adjusting device for selectively heating or cooling the same to maintain the controlled entering temperature between 67 degrees and 69 degrees F.; and through sprays for washing the air to remove odors and suspended matter, and therewith also permitting regulation of the humidity by control of the spray water temperature.

It has been found in practice that, when the above conditions of operation are observed, condensation is at a minimum and no appearance of condensation or drip is present after about 2 hours; whereas, in prior practices, from 25 to 30 hours have been required for drying the beef with respect to the condensate which is induced while raising the chilled meat to tenderizing temperature. This freedom from condensate has the advantage of avoiding the presence of the condensate as a superficial volatile layer which evaporates and measurably retards the heat transfer into the meat and thus increases the delay in reaching the desired temperature level for enzymatic action, wherewith a greater total time was required in the chamber along with the disadvantages of side reactions due to the longer time of exposure.

The absence of condensate facilitates the action of the sterilized air and of the ultra-violet lamps in immunizing organisms already present on the surface of the meat, in distinction from the slow, uncertain effects of ultra-violet when acting through water films. The instant procedure leads to a product which is essentially free of off-flavors in the fats such as may be produced by cleavage, hydrolysis, or oxidation of the molecule with a consequent undesirable flavor. Bacteria and other micro-organisms, particularly of the plant family, require warm moist conditions for their optimum growth; and hence the essential absence of excess surface moisture leads to lesser growth of such organisms.

The new procedure also reduces the total time within which the meat is held at the tenderizing temperature, as compared with prior processes, and hence there are not present either a high original organic population nor a time-temperature condition within which the possibly existing population can act to the essential detriment of the meat. Hence the waste substances from microbial metabolism are absent. Likewise, the essential absence of condensate and microorganisms during the course of the treatment represents a greatly reduced oxidation or other degeneration of blood and cell constituents which would otherwise result in a darkened appearance.

The net effect is a natural appearance of the meat and fat structures, representing an improvement over the products made under conditions of surface moistening through condensation.

The instant procedure produces as much as 40 to 50 percent greater tenderness than that of beef which has not been so treated.

With normal cattle, as taken by the slaughterhouses, a total time from kill to completed tenderization can be approximately 56 hours with this procedure, as compared with a time under prior processes for a corresponding effect, using the preliminary chill and then raising the temperature again, of about 120 hours. Thus, more than one-half of the prior time is saved, with the accompanying advantages in reduced shrinkage and handling, increased appearance value of the product, longevity in the cooler and during transportation, the lesser expense of plant of a size for a given out-put, lesser expense in the operation and lesser expense in overhead charges on material undergoing treatment. For example, it was found necessary to remove the skirts and hanging tenders, from carcasses of beef handled in prior procedures on a commercial scale, in order to obtain the necessary elimination of condensate, reduction of bacterial growth, and control of the chilling processes and holding times; and it was usually necessary to give three or more handlings under the prior procedures in order to assure proper contact of sterilized air and the exposure of all parts of the meat to surface sterilization and drip-elimination. Under the instant procedure, it is not necessary to remove these portions because of the greater air velocity, essential elimination of conditions producing condensate, and the absence of an initial chilling operation.

The invention is not limited to the illustrative procedure, and can be practiced in many ways within the scope of the appended claims.

What is claimed is:

1. The process of tenderizing meat which comprises subjecting the freshly killed meat continuously to tenderizing temperature during the time from slaughter until the tenderizing process is completed, including rapidly cooling the meat to a selected temperature between approximately 68° F. and 80° F. effective to stimulate enzymatic tenderizing action in the meat by contacting the same continuously with air substantially colder than the prevailing temperature of the meat, then holding the meat at said selected temperature over a period of approximately 44 to 56 hours in an atmosphere of circulating sterile air of a humidity essentially in equilibrium with the moisture content of the meat, the said latter period being effective to complete the desired tenderization of the meat and finally cooling the meat to a temperature sufficiently low to substantially inhibit further enzyme action.

2. A process of tenderizing meat which comprises subjecting the freshly killed meat continuously to tenderizing temperature during the time from slaughter until the tenderizing is completed, including quickly cooling the meat to a selected temperature effective to stimulate enzymatic tenderizing action in the meat by contacting the same continuously with air colder than the prevailing temperature of the meat, said quick cooling being at a rate effective to bring the meat to tenderizing temperature between approximately 68° F. and 80° F. prior to essential development of bacteria on the meat, and then holding the meat in a cooling environment of such temperature that the body temperature of the meat is maintained substantially uniformly between 68° F. and 80° F. over a period of approximately 44 to 56 hours, constituted by an atmosphere of circulating sterile air of a humidity essentially in equilibrium with the moisture content of the meat and then cooling the meat quickly to a final temperature effective for substantially preventing further tenderization.

3. The process of tenderizing meat which comprises subjecting the freshly killed meat continuously to tenderizing temperature conditions from the time of slaughter until the tenderizing process is completed, by first cooling the meat quickly, over a period of time not substantially exceeding 10 hours, to a selected tenderizing temperature between 68 and 80 degrees F. to stimulate enzymatic action in the meat, by contacting the same continuously with circulating sterile air substantially colder than the prevailing temperature of the meat, and thereafter immediately holding the meat within said range of tenderizing temperatures and in an atmosphere of circulating sterile air which has a humidity essentially in equilibrium with the moisture content of the meat and at a temperature at least as cold as the average temperature of the meat but not below essentially 68 degrees F., and for a period of time effective for completion of the desired tenderization of the meat and then cooling the meat quickly to a final temperature which is effective for preventing further substantial tenderization.

4. The process of tenderizing meat which comprises subjecting the freshly killed meat continuously to tenderizing temperatures during the time from slaughter until the tenderizing process is completed, including cooling the meat quickly to a selected temperature of 68 to 80 degrees F. effective to inhibit putrefaction but not inhibit enzymatic tenderizing action in the meat by contacting the same continuously with air colder substantially than the prevailing temperature of the meat, and then holding the meat in an atmosphere of circulating air at a temperature of about 68 degrees F. and having a relative humidity of 80 to 90 percent for a period of approximately 44 to 56 hours, during which the desired tenderization of the meat is effected, and then cooling the meat quickly to a final holding temperature of approximately 34° F.

5. A process of tenderizing meat which comprises subjecting the freshly killed meat continuously to tenderizing temperature during the time from slaughter until the tenderizing is completed, including quickly cooling the meat promptly after slaughtering, to a temperature of substantially 80 degrees F. by contacting the same continuously with circulating sterile air substantially colder than the prevailing temperature of the meat, said quick cooling being at a rate effective to bring the meat to tenderizing temperature prior to development of pronounced bacterial growth on the meat, then holding the meat in an atmosphere of circulating sterile air at an entering temperature of substantially 68 degrees F. and having a relative humidity of 80 to 90 percent for a period of approximately 44 to 56 hours, which is effective for the completion of the desired tenderization of the meat and finally cooling the meat quickly to a final holding temperature which is effective to substantially prevent putrefaction and substantial enzymatic action.

6. The process of tenderizing meat which comprises subjecting the freshly killed meat continuously to tenderizing temperatures during the time from slaughter until the tenderizing process is completed, the first portion of said time comprising quickly cooling the meat to essentially 80 degrees F. not substantially exceeding 10 hours by contacting the same continuously with circulating sterile air substantially colder than the prevailing temperature of the meat, and the second and immediately succeeding portion of said time comprising holding the meat over a period of approximately 44 to 56 hours in an atmosphere of circulating sterile air which has a temperature of about 68 degrees F. and a humidity essentially in equilibrium with the moisture content of the meat for a period of time effective for completion of the desired tenderization of the meat, the air throughout having a relative humidity of 80 to 90 percent and being, at all times, at a temperature at least as cold as the average temperature in the meat at such times, and the third and immediately succeeding portion of time comprising cooling the meat quickly to a temperature which is effective for preventing putrefaction or substantial enzymatic action.

WALTER REIMAN.
CHARLES L. ARNOLD.
WALTER A. TSCHIRGI.

REFERENCES CITED

The following references are of record in the file of this patent:

UNITED STATES PATENTS

| Number | Name | Date |
|---|---|---|
| 1,465,028 | Stacey | Aug. 14, 1923 |
| 1,988,319 | King | Jan. 15, 1935 |
| 2,169,081 | James | Aug. 8, 1939 |
| 2,192,348 | James | Mar. 5, 1940 |

OTHER REFERENCES

"Industrial Fellowship on Meat Merchandizing," 1940, by Mellon Institute, pages 2 to 6 inclusive, article entitled "The Tenderization of Meat."